United States Patent Office 3,787,430
Patented Jan. 22, 1974

3,787,430
DERIVATIVES OF DIPYRAZOLO[3,4-b; 3',4'-d] PYRIDINES
Hans Hoehn, Tegernheim, and Theodor Denzel, Nuremberg, Germany, assignors to E. R. Squibb & Sons, Inc., Princeton, N.J.
No Drawing. Filed July 13, 1972, Ser. No. 271,477
Int. Cl. A61k 27/00; C07d 49/18
U.S. Cl. 260—296 H    12 Claims

ABSTRACT OF THE DISCLOSURE

New derivatives of dipyrazolo[3,4-b; 3',4'-d]pyridines have the general formula

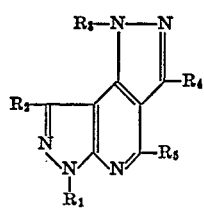

They and salts thereof are useful as central nervous system depressants. These compounds also increase the intracellular concentration of adenosine 3',5'-cyclic monophosphate.

SUMMARY OF THE INVENTION

This invention relates to new derivatives of dipyrazolo-[3,4-b; 3',4'-d]pyridines and salts thereof. These new compounds have the formula

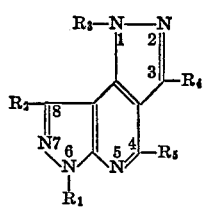

The symbols have the following meanings in Formula I and throughout this specification. $R_1$ is hydrogen, lower alkyl, phenyl, phenyl-lower alkyl, cyclo-lower alkyl or heterocyclic-lower alkyl, $R_2$ is hydrogen or lower alkyl, $R_3$ is hydrogen, lower alkyl, phenyl, phenyl-lower alkyl, lower alkanoyl, halo-lower alkanoyl, benzoyl, substituted benzoyl, di(lower alkyl)-amino-lower alkyl, lower alkanesulfonyl, benzenesulfonyl or toluenesulfonyl, $R_4$ is hydrogen, lower alkoxy, phenoxy, phenyl-lower alkoxy, amino, lower alkyl, phenyl or substituted phenyl, $R_5$ is hydrogen or lower alkyl.

Preferably $R_1$ is hydrogen or lower alkyl, especially ethyl, $R_2$ is hydrogen, $R_3$ is lower alkyl, especially methyl or ethyl, di-lower alkylamino-lower alkyl, especially dimethylaminopropyl, $R_4$ is lower alkoxy, especially ethoxy, lower alkyl, especially methyl or phenyl and $R_5$ is hydrogen or lower alkyl, especially methyl. The products of the examples, which are representative of the various compounds of this invention, constitute especially preferred embodiments.

The various substituent groups represented by the symbols are of the following types: the lower alkyl groups include straight or branched chain hydrocarbon groups of up to seven carbon atoms like methyl, ethyl, propyl, isopropyl, butyl, amyl, hexyl and the like, the lowest three members being preferred. The lower alkoxy groups include similar groups attached to oxygen like methoxy, ethoxy, propoxy, isopropoxy and the like. The cyclo-lower alkyl groups include the three to six carbon alicyclics cyclopropyl, cyclobutyl, cyclopentyl and cyclohexyl, the last two being preferred. The lower alkanoyl radicals include the acyl radicals of the lower fatty acids, acetyl, propionyl and butyryl in particular.

The di(lower alkyl)amino-lower alkyl groups are basic groups containing lower alkyl groups of the kind referred to above, e.g., dimethylaminomethyl, dimethylaminoethyl, dimethylaminopropyl, diethylaminoethyl, diethylaminomethyl, dipropylaminomethyl and the like, up to three carbon alkyl groups being preferred. The substituted benzoyl and substituted phenyl groups are those bearing one or two simple sustituents ($R_6$) on the phenyl moiety, such substituents ($R_6$) being halo, especially chloro or bromo, lower alkyl or lower alkoxy, especially the lower members having up to three carbons in the lower alkyl or lower alkoxy group.

The heterocyclic containing groups represented by $R_1$ include the heterocyclic radicals furyl, pyridyl, pyrimidyl or pyrazinyl attached to a lower alkyl group of the type discussed above. Preferred are furyl or pyridyl attached to a methylene ($CH_2$) group.

The lower alkanesulfonyl groups include methanesulfonyl, ethanesulfonyl and the like.

DETAILED DESCRIPTION

The new compounds of Formula I may be produced by several methods.

(a) A 5-aminopyrazole of the formula (II) 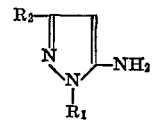

[produced analogous to the procedure described in Z.f. Chemie 10, 386 (1970)] is made to react with an alkoxymethylene acetoacetic acid ester of the formula (III) 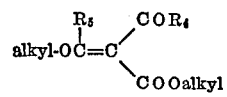

by heating at a temperature of about 120–130°. The resulting compound of the formula (IV) 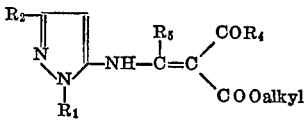

is cyclized in an inert organic solvent such as diphenyl ether at about 230° to about 260° C., while distilling off the alcohol formed, producing a compound of formula (V) 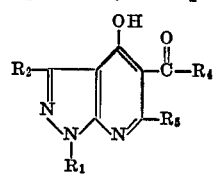

This compound of Formula V is refluxed for several hours with a phosphorus halide like phosphorusoxychloride to obtain the intermediate of formula (VI) 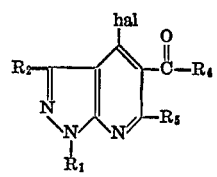

wherein hal represents halogen.

The product of Formula I is then prepared from the compound of Formula VI by reaction with the appropriate primary hydrazine of the formula
(VII)

This reaction is effected by treating the reactants either at room or elevated temperature.

Compounds of Formula I wherein $R_3$ is other than hydrogen may also be produced by reaction of a compound of Formula I wherein $R_3$ is hydrogen by alkylation or acetylation with an appropriate halide or acid halide, $R_3$ hal or $R_3CO$—hal, the chloride being preferred.

(b) According to a modification of the foregoing procedure a product of Formula I wherein $R_1$ is hydrogen may be produced. By this modification, a 5-aminopyrazole of Formula II, wherein $R_1$ is an arylmethyl group, or a heteromethyl group is used. This starting material has the formula (IIa)

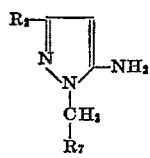

wherein $R_7$ is an aromatic or heterocyclic nucleus like phenyl, furyl, pyridyl, pyrimidyl, pyrazinyl or the like.

This material is processed as described above through the reaction with the alkoxymethylene acetoacetic acid ester of Formula III, cyclization of the product corresponding to Formula IV to obtain a compound of Formula V with a hydroxy group in the 4-position, which in turn by alkylation provides a compound of formula (VIII)

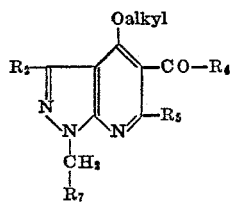

At this point, the compound of Formula VIII is oxidized with an oxidizing agent like selenium dioxide in a high boiling solvent like diethyleneglycol dimethyl ether at about 160° C. This yields a compound of the formula (IX)

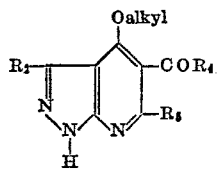

and this product may be treated with the hydrazine as described above.

(c) According to another method, a product of Formula I, wherein $R_4$ is amino, may be produced by reaction of a compound of the formula (X)

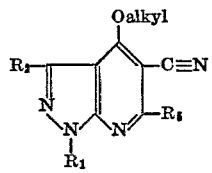

with the appropriate hydrazine of Formula VII.

This compound with the cyano group in the 5-position is produced as shown below:

A 5-aminopyrazole of Formula II is made to react with an alkoxymethylene malonic acid dialkylester of the formula (XI)

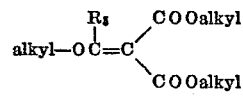

producing a compound of Formula IV wherein $R_4$ is an alkoxy moiety. This material is processed as described above with cyclization, providing a compound of Formula V with an ester moiety in the 5-position. Alkylating that product, e.g., with an alkyl sulfate like methyl sulfate, leads to a compound of the formula (VIIIa)

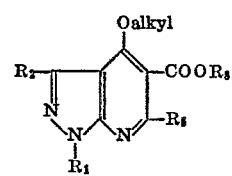

wherein $R_8$ is an alkyl moiety, which in turn is saponified, e.g., with a base like sodium hydroxide, producing a compound of the formula (XII)

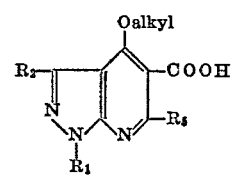

This acid is transformed to a product of the formula (XIII)

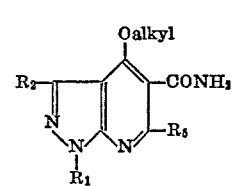

by treatment with an inorganic acid chloride like thionyl chloride, followed by reaction with gaseous ammonia. Repeating the reaction of the compound of Formula XIII with the inorganic acid chloride leads to the compound of Formula X.

(d) According to another method, a product of Formula I, wherein $R_4$ is an alkoxy, phenoxy or phenyl-lower alkoxy group, may be produced by reaction of a compound of Formula VIIIa with the appropriate hydrazine of the Formula VII providing a compound of the formula (XIV)

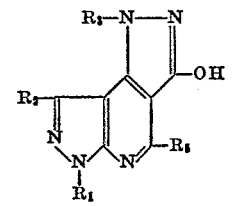

Monosubstitution, or disubstitution if $R_3$ is hydrogen, occurs upon reaction of the alkali metal salt, like the sodium or potassium salt of a compound of Formula XIV with an alkyl halide, phenyl halide, phenyl-lower alkyl halide or ester like dimethylsulfate or ethyl tosylate giving a compound of the formula (XV)

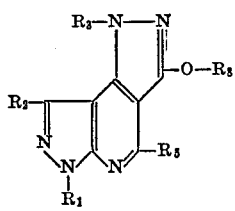

wherein $R_8$ is lower alkyl, phenyl or phenyl-lower alkyl.

An alternative route for preparing a dipyrazolopyridine compound of Formula XIV is the stepwise introduction of the hydrazine moiety into the pyrazolopyridine molecule starting with a derivative of Formula V with an ester group in the 5-position. Replacement of the 4-hydroxy group by halogen, e.g. chlorine, the hydrazinolysis of the 4-chlorine compound as well as ring closure of the 4-hydrazino pyrazolopyridine of the formula (XVI)

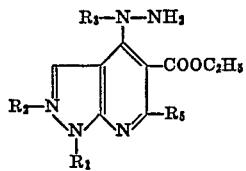

gives rise to the dipyrazolopyridine compound of Formula XIV too.

(e) According to a modification of the foregoing procedure, a product of Formula XV, wherein $R_3$ is hydrogen, may be produced. By this modification, a dipyrazolopyridine of Formula XV, wherein $R_3$ is furylmethyl or another heteromethyl group, is used. This compound is oxidized with an oxidizing agent like selenium dioxide in a high boiling solvent like diethyleneglycol dimethylether at about 160° C.

Products of Formula I wherein $R_3$ is an alkanesulfonyl or arylsulfonyl group are produced from products of that formula wherein $R_3$ is hydrogen by treatment with the appropriately substituted sulfonyl halide, e.g., methanesulfonyl chloride, benzenesulfonyl chloride, toluenesulfonyl chloride, etc.

The compounds of Formula I form salts, which are also part of this invention. The salts include acid addition salts, particularly the non-toxic, physiologically acceptable members. The bases of Formula I form salts by reaction with a variety of inorganic and organic acids providing acid addition salts including, for example, hydrohalides (especially hydrochloride and hydrobromide), sulfate, nitrate, borate, phosphate, oxalate, tartrate, malate, citrate, acetate, ascorbate, succinate, benzenesulfonate, methanesulfonate, cyclohexanesulfamate and toluenesulfonate. The acid addition salts frequently provide a convenient means for isolating the product, e.g., by forming and precipitating the salt in an appropriate menstrum in which the salt is insoluble, then after separation of the salt, neutralizing with a base such as barium hydroxide or sodium hydroxide, to obtain the free base of Formula I. Other salts may then be formed from the free base by reaction with an equivalent of acid.

The new compounds of this invention are central nervous system depressants and may be used as tranquilizers or ataractic agents for the relief of anxiety and tension states, for example, in mice, cats, rats, dogs, and other mammalian species, in the same manner as chloridazepoxide. For this purpose a compound or mixture of compounds of Formula I or non-toxic, physiologically acceptable acid addition salt thereof, may be administered orally or parenterally in a conventional dosage form such as tablet, capsule, injectable or the like. A single dose, or preferably 2 to 4 divided daily doses, provided on a basis of about 1 to 50 mg. per kilogram per day, is appropriate. These may be conventionally formulated in an oral or parenteral dosage form by compounding about 10 to 250 mg. per unit of dosage with conventional vehicle, excipient, binder, preservative, stabilizer, flavor or the like as called for by accepted pharmaceutical practice.

The new compounds also increase the intracellular concentration of adenosine-3',5'-cyclicmonophosphate, and thus by the administration of about 1 to 100 mg./kg./day, preferably about 10 to 50 mg./kg., in single or two to four divided doses, in conventional dosage forms such as those described above, may be used to alleviate the symptoms of asthma.

The following examples are illustrative of the invention and constitute preferred embodiments. All temperatures are on the centigrade scale.

EXAMPLE 1

1-[3-(dimethylamino)propyl]-6-ethyl-3-phenyl-1H,6H-dipyrazolo[3,4-b; 3',4'-d]pyridine (a) 5-benzoyl - 1 - ethyl-4-hydroxy-1H-pyrazolo[3,4-b]pyridine.—222 g. of 5-amino-1-ethylpyrazole (2 mol.) and 496 g. of ethoxymethylenebenzoyl-acid ethyl ester (2 mol.) are heated to about 140°, with stirring, until no more alcohol distills. The temperature is then raised to 240°. The alcohol formed is distilled off in vacuo. After about one hour, the reaction is finished, the residue is cooled to room temperature and 500 ml. of methanol are added. 5-benzoyl - 1 - ethyl-4-hydroxypyrazolo[3,4-b] pyridine crystallizes and is filtered off, yield 360 g. (67%) M.P. 151°.

(b) 5-benzoyl - 4 - chloro-1-ethyl-1H-pyrazolo[3,4-b] pyridine.—53.5 g. of 5-benzoyl-1-ethyl-4-hydroxy-1H-pyrazolo[3,4-b]pyridine (0.2 mol.) and 150 ml. of phosphorus oxychloride are refluxed at 150° for 5 hours. The excess of phosphorus halide is removed in vacuo and the residue is neutralized with saturated sodium bicarbonate solution. The pale yellow crystals of 5-benzoyl-4-chloro-1-ethyl-1H-pyrazolo[3,4-b]pyridine are filtered off and recrystallized from ethyl acetate, yield 35 g. (61%), M.P. 140°.

(c) 6-ethyl - 3 - phenyl-1H,6H-dipyrazolo[3,4-b; 3',4'-d]pyridine.—28.5 g. of 5-benzoyl-4-chloro-1-ethyl-1H- pyrazolo[3,4-b]pyridine (0.1 mol.) are dissolved in 100 ml. of butyl alcohol and 10 g. of hydrazine hydrate (0.2 mol.) are added. The mixture is refluxed for 3 hours and then evaporated to dryness. 100 ml. of water are added and the 6-ethyl-3-phenyldipyrazolo[3,4-b; 3',4'-d]pyridine is filtered and recrystallized from butanol, yield 22 g. (84%) M.P. 92–93°.

(d) 1-[3-(dimethylamino)propyl] - 6 - ethyl-3-phenyl-1H,6H-dipyrazolo[3,4-b; 3',4'-d]pyridine.—2.63 g. of 6-ethyl - 3 - phenyl-1H,6H-dipyrazolo[3,4-b; 3',4'-d]pyridine (0.01 mol.) and 0.55 g. of sodium hydride are heated at 60° in 50 ml. of diethyleneglycol dimethyl ether for 30 minutes. After this time 1.6 g. of 3-(dimethylamino) propyl chloride (0.01 mol.) are added and the mixture is kept at 90° for 14 additional hours. The solution is filtered hot, evaporated to dryness and the oily residue recrystallized from ethyl acetate-petroleum ether, yielding 2.8 g. of 1-[(3-dimethylamino)propyl]-6-ethyl - 3-phenyl-1H,6H - dipyrazolo[3,4-b; 3',4'-d]pyridine (80%), M.P. 85°.

EXAMPLE 2

1,3-dimethyl-6-ethyl-1H,6H-dipyrazolo[3,4-b; 3',4'-d]pyridine (a) [[(1 - ethyl - 5 - pyrazolyl)amino]methylene]acetoacetic acid ethyl ester.—222 g. of 1-ethyl-5-aminopyrazole (2 mol.) and 372 g. of ethoxymethylene acetoacetic acid ethyl ester (2 mol.) are heated together at 120–130° with stirring, until the theoretical amount of alcohol is distilled off. Cooling and recrystallization from methanol yields 375 g. of [[(1-ethyl-5-pyrazolyl)amino]methylene]acetoacetic acid ethyl ester (74%) M.P. 53–55°.

(b) 5-acetyl - 1 - ethyl-4-hydroxy-1H-pyrazolo[3,4-b]pyridine.—300 g. of [[(1-ethyl-5-pyrazolyl)amino]methylene]acetoacetic acid ethyl ester (1.2 mol.) are placed in a flask which is heated in an oil bath for 5 min. at 260°, while the alcohol formed is distilled off. After this time the flask is cooled as rapidly as possible. The residue is recrystallized from methanol and yields 148 g. of 5-acetyl - 1 - ethyl-4-hydroxy-1H-pyrazolo[3,4-b]pyridine (60%) M.P. 155–157°.

(c) 5 - acetyl-4-ethoxy-1-ethyl-1H-pyrazolo[3,4-b]pyridine.—102 g. of 5-acetyl-1-ethyl-4-hydroxy-1H-pyrazolo-[3,4-b]pyridine (0.5 mol.) are dissolved in 500 ml. of dimethylformamide. 100 g. of potassium carbonate (0.71 mol.) and 117 g. of ethyl iodide (0.75 mol.) are added. The mixture is heated for 10 hours with continuous stirring at 60–70°. The precipitate is filtered off and the liquid phase evaporated to about 100 ml. After addition of 500 ml. of water, 5-acetyl-4-ethoxy-1-ethyl-1H-pyrazolo[3,4-b]pyridine precipitates and yields on filtration 92 g. (73%), M.P. 136°.

(d) 6-ethyl-1,3-dimethyl-1H,6H-dipyrazolo[3,4-b; 3',4'-d]pyridine.—23.3 g. 5-acetyl-4-ethoxy-1-ethyl-1H-pyrazolo[3,4-b]pyridine (0.1 mol.) are refluxed with 5 g. of methylhydrazine in 50 ml. of butyl alcohol for 4 hours. After this time, 6-ethyl-1,3-dimethyl-1H,6H-dipyrazolo-[3,4-b; 3',4'-d]pyridine precipitates on cooling and is filtered off, yield 15 g. (70%), M.P. 110°.

EXAMPLE 3

1-(p-chlorobenzoyl)-6-ethyl-3-methyl-1H,6H-dipyrazolo[3,4-b; 3',4'-d]pyridine (a) 6-ethyl-3-methyl-1H,6H-dipyrazolo[3,4-b; 3',4'-d]pyridine.—23.3 g. of 5-acetyl-4-ethoxy-1-ethyl-1H-pyrazolo[3,4-b]pyridine (0.1 mol.) are dissolved in 50 ml. of butanol and 5 g. of hydrazine hydrate (0.1 mol.) are added. The mixture is heated for 4 hours under reflux. 6 - ethyl - 3-methyl-1H,6H-dipyrazolo[3,4-b; 3',4'-d]pyridine precipitates on cooling and is filtered off, yield 12 g. (60%), M.P. 178°.

(b) 1-(p-chlorobenzoyl)-6-ethyl-3-methyl - 1H,6H - dipyrazolo[3,4-b; 3',4'-d]pyridine. — 10 g. of 6-ethyl-3-methyl - 1H,6H - dipyrazolo[3,4-b; 3',4'-d]pyridine (0.05 mol.) are suspended in 100 ml. of anhydrous tetrahydrofuran. 1.2 g. of sodium hydride are added and the mixture is refluxed for 30 minutes. 8.7 g. of p-chlorobenzoyl chloride are dropped in with stirring. The mixture is kept at room temperature for two hours, then filtered and the filtrate evaporated to dryness. The oily residue yields on recrystallization from ethyl acetate, 12 g. of p-chlorobenzoyl - 6 - ethyl-3-methyl-1H,6H-dipyrazolo[3,4-b; 3',4'-d]pyridine (71%), M.P. 170°.

EXAMPLE 4

3-amino-6-ethyl-1H,6H-dipyrazolo[3,4-b; 3',4'-d]pyridine (a) [[(1 - ethyl-5-pyrazolyl)amino]methylene]malonic acid diethyl ester.—245 g. of 1-ethyl-5-aminopyrazole (2.2 mol.) and 476 g. of ethoxymethylene malonic acid diethyl ester (2.2 mol.) are heated to 120° (bath temperature) for 2 hours with stirring. The ethanol formed by this reaction is removed by means of a water aspirator. Then vacuum distillation (B.P. 0.1 154–160°) yields 520 g. (84%) of a quickly crystallizing oil, [[(1-ethyl-5-pyrazolyl)amino]methylene]malonic diethyl ester, M.P. 50–53°. The compound is recrystallized from N-hexane, M.P. 55–57°.

(b) 1-ethyl-4-hydroxy-1H-pyrazole[3,4-b]pyridine - 5-carboxylic acid ethyl ester.—253 g. of [[(1-ethyl-5-pyrazolyl)amino]methylene]malonic acid diethyl ester (0.09 mol.) are dissolved in 770 g. of diphenyl ether. The reaction mixture is heated to 235–250° (bath temperature) and allowed to react at this temperature for 1–2 hours while the resulting ethanol is continuously distilled off. The last amount of alcohol is removed by means of a water aspirator. The diphenyl ether is separated by distillation with a fractionating column in vacuo. The 1-ethyl-4 - hydroxy-1H-pyrazolo[3,4-b]pyridine-5-carboxylic acid ethyl ester is obtained at B.P.$_{0.05}$ 115–120°, yield 195 g.=92%, M.P. 85–87°. The compound is recrystallized from benzene (90 to 100°), M.P. 87–89°.

(c) 4-ethoxy-1-ethyl-1H-pyrazolo[3,4-b]pyridine-5-carboxylic acid.—In a solution of 259 g. (1.1 mol.) of 1-ethyl-4-hydroxy-1H-pyrazolo[3,4-b]pyridine-5 - carboxylic acid ethyl ester in 1700 ml. of dimethylformamide, 400 g. of well pulverized potassium carbonate and 300 g. of ethyl iodide are introduced. The reaction mixture is stirred for 7 hours at 65° and filtered under suction, while hot, from excess potassium carbonate. Upon standing overnight, 165 g. of 4-ethoxy-1-ethyl-1H-pyrazolo[3,4-b]pyridine-5-carboxylic acid ethyl ester crystallize out of the solution, M.P. 112–115°. After evaporation of the mother liquor, an additional 80 g. are obtained. The total yield amounts to 85% of theory. The compound is recrystallized from benzene (90 to 100°), M.P. 113–115°.

By hydrolyzing this product as in part (b) 4-ethoxy-1-ethyl-1H-pyrazolo[3,4-b]pyridine-5-carboxylic acid is obtained, M.P. 198–199°.

(d) 4-ethoxy-1-ethyl-pyrazolo[3,4-b]pyridine-5-carboxamide.—117.5 g. of 4-ethoxy-1-ethyl-1H-pyrazolo[3,4-b]pyridine-5-carboxylic acid (0.5 mol.) are slowly added with stirring to 300 ml. of thionyl chloride. The mixture is refluxed for 4 hours, excess thionyl chloride is removed in vacuo and the residue dissolved in 1 liter of anhydrous tetrahydrofuran. Over a period of 3 hours gaseous ammonia is passed through the solution with vigorous stirring at 60°. After this time, the precipitated 4-ethoxy-1-ethyl - 1H-pyrazolo[3,4-b]pyridine-5-carboxamide is filtered, washed with water and recrystallized from methanol, yield 92 g. (94%), M.P. 168–170°.

(e) 5 - cyano-4-ethoxy-1-ethyl-1H-pyrazolo[3,4-b]pyridine. — 117 g. of 4 - ethoxy-1-ethyl-1H-pyrazolo[3,4-b]pyridine-5-carboxamide (0.5 mol.) are added to 350 ml. of thionyl chloride and the mixture is refluxed for 5 hours. After this time the excess thionyl chloride is distilled off, the residue is neutralized with saturated sodium bicarbonate solution and extracted four times with 100 ml. portions of chloroform. The organic layer is collected, dried over sodium sulfate, filtered and evaporated to dryness. The residue yields on recrystallization from alcohol 82 g. of 5-cyano-4-ethoxy-1-ethyl-1H-pyrazolo-[3,4-b]pyridine (76%), M.P. 175–176°.

(f) 3 - amino-6-ethyl-1H,6H-dipyrazolo[3,4-b; 3',4'-d]pyridine. — 4.3 g. of 5-cyano-4-ethoxy-1-ethyl-1H-pyrazolo[3,4-b]pyridine are refluxed for 10 minutes with 10 ml. of hydrazine hydrate. The mixture is cooled and 50 ml. of water are added. 3-amino-6-ethyl-1H,6H-dipyrazolo[3,4-b; 3',4'-d]pyridine precipitates, is filtered and recrystallized from butane, yield 2.7 g. (67%), M.P. 230–232°.

The following additional compounds are obtained by substituting the appropriate starting material in the procedure of the example indicated.

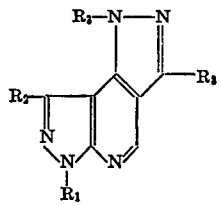

| Example | R₁ | R₂ | R₃ | R₄ | M.P. | Procedure of Example |
|---|---|---|---|---|---|---|
| 5 | C₂H₅ | H | CH₃ | NH₂ | 178–180° | 4 |
| 6 | C₂H₅ | H | H | CH₃ | 100–101° | 2 |
| 7 | C₂H₅ | H | C₂H₅ | CH₃ | 75–77° | 2 |
| 8 | C₂H₅ | H | CH₃ | ⌬ (phenyl) | 140–141° | 1 |
| 9 | C₂H₅ | H | C₂H₅ | Same as above | 80–81° | 1 |
| 10 | C₂H₅ | H | Cl–⌬–CO | do | 110–111° | 3 |

EXAMPLE 11

1-[2-(diethylamino)ethyl]-1H,6H-dipyrazolo[3,4-b; 3',4'-d]pyridine (a) [[[1-(4-picolyl)-5 - pyrazolyl]amino]methylene]malonic acid diethyl ester.—174 g. of 1-(4-picolyl)-5-aminopyrazole and 216 g. of ethoxymethylene malonic acid diethyl ester are heated with stirring at 140°, until the theoretical amount of alcohol has distilled off. The reaction mixture crystallizes on cooling. Recrystallization from ethyl acetate yields 220 g. of [[[1-(4-picolyl)-5-pyrazolyl]amino]methylene]malonic acid diethyl ester (65%), M.P. 95–97°.

(b) 4 - hydroxy - 1-(4-picolyl)-1H-pyrazolo[3,4-b]pyridine-5-carboxylic acid ethyl ester.—86 g. of [[[1-(4-picolyl)-5-pyrazolyl]amino]methylene]malonic acid diethyl ester (0.25 mol.) are heated at 240° for 15 minutes. The dark oil is cooled and 200 ml. of methanol are added. 4 - hydroxy - 1-(4-picolyl)-1H-pyrazolo[3,4-b]pyridine-5-carboxylic acid ethyl ester crystallizes on standing, yield 33 g. (44%), M.P. 140°.

(c) 4 - hydroxy-1H-pyrazolo[3,4-b]pyridine-5-carboxylic acid ethyl ester.—3 g. of 4-hydroxy-1-(4-picolyl)-1H-pyrazolo[3,4-b]pyridine-5-carboxylic acid ethyl ester (0.01 mol.) are dissolved in 20 ml. of acetic acid. 2.2 g. of selenium dioxide (0.02 mol.) and 2–3 drops of water are added. The mixture is refluxed for 30 minutes and then filtered off. 4-hydroxy-1H-pyrazolo[3,4-b]pyridine-5-carboxylic acid ethyl ester precipitates on cooling. Recrystallization from acetic acid yields 1.8 g. (87%), M.P. 275°.

(d) 4 - chloro-1H-pyrazolo[3,4-b]pyridine-5-carboxylic acid ethyl ester.—A mixture of 2.3 gm. of 4-hydroxy-1H-pyrazolo[3,4-b]pyridine-5-carboxylic acid ethyl ester and phosphorus oxychloride is refluxed for four hours. The excess phosphorous oxychloride is removed by vacuum distillation. The residual 4-chloro-1H-pyrazolo[3,4-b]pyridine-5-carboxylic acid ethyl ester is treated with water and filtered under suction.

(e) 1H,6H - dipyrazolo[3,4 - b; 3',4'-d]pyridine.—4-chloro-1H-pyrazolo[3,4-b]pyridine-5-carboxylic acid ethyl ester is treated with hydrazine hydrate according to the procedure of Example 1 (c) to obtain 1H,6H-dipyrazolo[3,4-b; 3',4'-d]pyridine.

(f) 1-[2-(diethylamino)ethyl] - 1H,6H-dipyrazolo[3,4-b; 3',4'-d]pyridine.—2.5 g. of 1H,6H-dipyrazolo[3,4-b; 3',4'-d]pyridine is treated with 2-(diethylamino)ethyl chloride according to the procedure of Example 1 to obtain 1-[2-(diethylamino)ethyl]-1H,6H - dipyrazolo[3,4-b; 3',4'-d]pyridine.

EXAMPLE 12

1-[3-(dimethylamino)propyl] - 6-ethyl-8-methyl-3-phenyl-1H,6H-dipyrazolo[3,4-b; 3',4'-d]pyridine By substituting an equivalent amount of 1-ethyl-3-methyl-5-aminopyrazole for the 5-amino-1-ethylpyrazole in the procedure of Example 1, then proceeding through all parts of that example, there are obtained 6-ethyl-8-methyl-3-phenyl-1H,6H-dipyrazolo[3,4 - b; 3',4' - d]pyridine and 1-[3-(dimethylamino)propyl]-6-ethyl-8-methyl-3-phenyl-1H,6H-dipyrazolo[3,4-b; 3',4'-d]pyridine.

The following additional compounds are produced by the foregoing procedure.

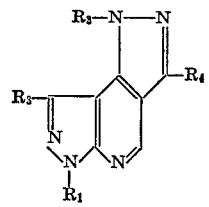

| Example | R₁ | R₂ | R₃ | R₄ |
|---|---|---|---|---|
| 13 | ⌬–CH₂– | CH₃ | ⌬–CH₂– | NH₂ |
| 14 | ⟨S⟩– | CH₃ | H | CH₃ |
| 15 | ⟨S⟩– | H | H | C₂H₅ |

TABLE—Continued

| Example | R₁ | R₂ | R₃ | R₄ |
|---|---|---|---|---|
| 16 | furyl-CH₂ (furfuryl) | H | C₂H₅ | phenyl |
| 17 | phenyl- | CH₃ | C₂H₅ | C₂H₅ |
| 18 | H | H | CH₃CO— | H |
| 19 | C₂H₅ | C₂H₅ | phenyl | phenyl |
| 20 | H | H | phenyl-CO— | CH₃ |
| 21 | C₂H₅ | CH₃ | 2,6-dibromophenyl-CO | H |
| 22 | C₂H₅ | H | CH₃SO₂— | Cl-phenyl- |
| 23 | C₂H₅ | H | CH₃-phenyl-SO₂— | CH₃ |
| 24 | CH₃ | CH₃ | phenyl | CH₃O-phenyl- |
| 25 | C₂H₅ | CH₃ | (C₂H₅)₂N(C₂H₄)— | CH₃ (HCl) |
| 26 | C₂H₅ | CH₃ | C₂H₅CO— | CH₃ |
| 27 | C₂H₅ | H | ClCH₂CO— | CH₃ |
| 28 | H | H | BrCH₂CH₂CO— | CH₃ |

EXAMPLE 29

1,6-diethyl-3-ethoxy-1H,6H-dipyrazolo[3,4 - b; 3',4' - d]-pyridine (a) [(1 - ethyl - 5-pyrazolyl)aminomethylene]malonic acid diethyl ester.—245 g. of 1-ethyl-5-aminopyrazole (2.2 mol.) and 476 g. of ethoxymethylene malonic acid diethyl ester (2.2 mol.) are heated to 120° (bath temperature) for 2 hours with stirring. The ethanol formed by this reaction is removed by means of a water aspirator. Then vacuum distillation (B.P.$_{0.1}$ 154–160°) yields 520 g. (84% of theory) of a quickly crystallizing oil, [1-ethyl-5-pyrazolyl)aminomethylene]malonic acid diethyl ester, M.P. 50–53°.

(b) 1 - ethyl - 4-hydroxy-1H-pyrazolo[3,4-b]pyridine-5-carboxylic acid ethyl ester.—253 g. of [(1-ethyl-5-pyrazolyl)aminomethylene]malonic acid diethyl ester (0.9 mol.) are dissolved in 770 g. of diphenyl ether. The reaction mixture is heated to 235–250° (bath temperature) and allowed to react at this temperature for 1–2 hours while the resulting ethanol is continuously distilled off. The last amount of alcohol is removed by means of a water aspirator. The diphenyl ether is separated by distillation with a fractionating column in vacuo. The 1-ethyl-4-hydroxy-1H-pyrazolo[3,4-b]pyridine - 5-carboxylic acid ethyl ester is obtained at B.P$_{0.05}$ 115–120° (yield 195 g.= 92% of theory), M.P. 85–87°.

(c) 4 - ethoxy - 1-ethyl-1H-pyrazolo[3,4-b]pyridine-5-carboxylic acid ethyl ester.—To a solution of 259 g. of 1-ethyl-4-hydroxy-1H-pyrazolo[3,4-b]pyridine-5 - carboxylic acid ethyl ester (1.1 mol.) in 1700 ml. of dimethylformamide, 400 g. of well pulverized potassium carbonate and 300 g. of ethyl iodide are introduced. The reaction mixture is stirred for 7 hours at 65° and filtered under suction, while hot, from excess potassium carbonate. Upon standing overnight, 165 g. of 4-ethoxy-1-ethyl-1H-pyrazolo[3,4-b]pyridine - 5 - carboxylic acid ethyl ester crystallize out of the solution, M.P. 112–115°. After evaporation of the mother liquor, an additional 80 g. are obtained. The total yield amounts to 85% of theory.

(d) 1 - ethyl-4-hydrazino-1H-pyrazolo[3,4-b]pyridine-5-carboxylic acid ethyl ester.—316 g. of 4-ethoxy-1-ethyl-1H-pyrazolo[3,4-b]pyridine-5-carboxylic acid ethyl ester (1.2 mol.) are dissolved in 4.8 l. of absolute ethanol. Into this solution, 72 g. of hydrazine hydrate (100%) and 0.4 g. of zinc chloride are added. After refluxing for 4 hours, the hot solution is filtered, evaporated to dryness in vacuo and the white crystalline residue is crystallized from benzene-ligroin mixture (1:3). There are obtained 250 g. of 1-ethyl-4-hydrazino-1H-pyrazolo[3,4-b]pyridine-5-carboxylic acid ethyl ester, M.P. 139–140°.

(e) 6 - ethyl-3-hydroxy-1H,6H-dipyrazolo[3,4-b; 3',4'-d]pyridine, potassium salt.—To a solution consisting of 5.08 g. of potassium (0.13 mol.) in 150 ml. of absolute alcohol there are added 10 g. of 1-ethyl-4-hydrazino-1H-pyrazolo[3,4-b]pyridine-5-carboxylic acid ethyl ester (0.04 mol.). The mixture is allowed to stay 3 hours at room temperature. Subsequently, the alcoholic solution is evaporated to dryness. The residual potassium salt is treated with 100 ml. of ether, filtered off and stored in a desiccator because of its hygroscopicity. Yield 9.5 g.

(f) 1,6-diethyl - 3 - ethoxy - 1H,6H-dipyrazolo[3,4-b; 3'-4'-d]pyridine.—To a solution of 14.5 g. of 6-ethyl-3-hydroxy-1H,6H-dipyrazolo[3,4-b; 3',4'-d]pyridine, potassium salt (0.06 mol.) in 175 ml. of dimethylformamide, 8.3 g. of well pulverized potassium carbonate (0.06 mol.) and 26.2 g. of ethyl iodide (0.168 mol.) are added. The reaction mixture is stirred for 5 hours at 50–60° (bath temperature), then cooled to room temperature, filtered under suction from excess potassium carbonate and evaporated to dryness in vacuo. The residue is treated with 150 ml. of water while stirring 20 minutes, filtered under suction and dried over phosphorus pentoxide in a desiccator. Yield 13.6 g. (87.7%), M.P. 88–91°. The 1,6- diethyl-3-ethoxy - 1H,6H - dipyrazolo[3,4 - b; 3',4' - d] pyridine is recrystallized from N-hexane, M.P. 90–92°.

EXAMPLE 30

3-ethoxy-6-ethyl-1H,6H-dipyrazolo[3,4-b; 3',4'-d] pyridine (a) 4-chloro-1-ethyl - 1H - pyrazolo[3,4 - b]pyridine-5-carboxylic acid ethyl ester.—A mixture of 23.5 g. of 1-ethyl-4-hydroxy-1H-pyrazolo[3,4-b]pyridine - 5 - carboxylic acid ethyl ester (0.1 mol.) and 150 ml. of phosphorus oxychloride is refluxed for four hours. Subsequently the excess phosphorus oxychloride is removed by distillation in vacuo. As soon as the phosphorus oxychloride has been removed, the oily residue solidifies on cooling. It is treated with water and filtered under suction to obtain 4-chloro-1-ethyl-1H-pyrazolo[3,4-b]pyridine-5-carboxylic acid ethyl ester (24.5 g.), M.P. 55–60°. This product is recrystallized from n-hexane (22.5 g.=87%), M.P. 62°.

(b) 1-ethyl-4-hydrazino-1H-pyrazolo[3,4 - b]pyridine-5-carboxylic acid, ethyl ester.—20.3 g. of 4-chloro-1-ethyl-1H-pyrazol[3,4-b]pyridine-5-carboxylic acid, ethyl ester (0.08 mol.) are dissolved in 200 ml. of benzene and 15 ml. of alcohol, then 9.6 g. of 100% hydrazine hydrate (0.192 mol.) are added. The reaction mixture is stirred at room temperature for 48 hours, then separated from the aqueous hydrazine hydrochloride and evaporated to dryness in vacuo. The residual 1-ethyl-4-hydrazino-1H-pyrazolo[3,4-b]pyridine-5-carboxylic acid, ethyl ester is treated with water, filtered off, dried in the desiccator over phosphorus pentoxide (yield 18 g.=90% of theory) and recrystallized from benzene and ligroin, M.P. 139–140°.

(c) 6-ethyl-3-hydroxy-1H,6H - dipyrazolo[3,4 - b; 3', 4'-d]pyridine, potassium salt.—24.9 g. of 1 - ethyl - 4-hydrazino-1H-pyrazolo[3,4-b]pyridine - 5 - carboxylic acid ethyl ester (0.1 mol.) are added to a solution of 3.9 g. of potassium (0.1 mol.) in 300 ml. of absolute ethanol. The whole is stirred for 2½ hours at room temperature, then evaporated to dryness in vacuo and the residue is treated with 150 ml. of ether. By suction, a slightly hydroscopic potassium salt of 6-ethyl-3-hydroxy - 1H,6H - dipyrazolo[3,4-b; 3',4'-d]pyradine is obtained in almost quantitative yield, M.P. >300°.

(d) 6-ethyl-1-(2-furyl)methyl - 3 - hydroxy - 1H,6H-dipyrazolo[3,4-b; 3',4'-d]pyradine.—19.2 g. of 6-ethyl-3-hydroxy-1H,6H-dipyrazolo[3,4-b; 3',4'-d]pyridine potassium salt (0.08 mol.) are dissolved in 120 ml. of dimethylformamide and 10.2 g. of α-furfuryl-chloride (0.088 mol.) are added. The solution is stirred at room temperature for four hours, and then evaporated in vacuo. The solid residue is treated with much water, filtered off, dried and recrystallized from 96% ethanol, yielding 18.5 g. (81.8%) of 6-ethyl-1-(2-furyl)methyl - 3 - hydroxy - 1H,6H - dipyrazolo[3,4-b; 3',4'-d]pyridine, M.P. 246–248 decomp.

(e) 3-ethoxy-6-ethyl-1-(2-furyl)methyl - 1H,6H - dipyrazolo[3,4-b; 3',4'-d]pyridine.—17 g. of 6-ethyl-1-(2-furyl)methyl-hydroxy-1H,6H - dipyrazolo[3,4-b; 3',4'-d] pyridine (0.06 mol.) are suspended in a solution of 2.4 g. of potassium (0.06 mol.) in 75 ml. of absolute ethanol. After stirring at room temperature for three hours, the alcohol is distilled off in vacuo and the residual potassium salt is dissolved in 150 ml. of dimethylformamide. Subsequently, 12 g. of ethyl iodide (0.078 mol.) are added, the whole is stirred at room temperature for 10 hours and then evaporated in vacuo. 150 ml. of water are added to the residue, and the mixture is stirred for half an hour. The 3-ethoxy-6-ethyl - 1 - (2 - furyl)methyl-1H,6H-dipyrazolo[3,4-b; 3',4'-d]pyridine is filtered under suction, dried in a desiccator over phosphorus pentoxide and recrystallized from cyclohexane to give 14.2 g. (76.3%) of the compound, M.P. 136–138°.

(f) 3-ethoxy-6-ethyl-1H,6H-dipyrazolo[3,4 - b; 3',4'-d] pyridine.—4.6 g. of 3-ethoxy-6-ethyl-1-(2-furyl)methyl-1H,6H-dipyrazolo[3,4 - b; 3',4' - d]pyridine (0.015 mol.) are suspended in 300 ml. of diethyleneglycol dimethylether. After adding 5 g. of seleniumdioxide (0.045 mol.) and 0.54 g. of water (0.03 mol.), the reaction mixture is heated at 160–165° (bath temperature) for 6 hours and then filtered off. Subsequently, the solvent is distilled off in vacuo and the residue is treated with water and extracted thrice with a total of 75 ml. of ether. The ethereal solution is dried over sodium sulfate and then distilled off in vacuo to give 2.8 g. (81%) of crude-ethoxy-6-ethyl-1H,6H-dipyrazolo[3,4-b; 3'4'-d]pyridine, which, after recrystallizing from acetonitrile, melts at 184–186°.

EXAMPE 31

4,8-dimethyl-3-ethoxy-6-ethyl-1-(2-phenylethyl)-1H,6H-dipyrazolo[3,4-b; 3',4'-d]pyridine (a) 3,6-dimethyl-1-ethyl-4 - hydroxy - 1H - pyrazolo-[3,4-b]pyridine-5-carboxylic acid ethyl ester.—87.5 g. of 1-ethyl-3-methyl-5-aminopyrazole (0.7 mol.) and 151 g. of acetomalonic acid ethyl ester (0.75 mol.) are added to 275 g. of polyphosphoric acid. The mixture is heated with stirring at 130° for one hour. After this period, the mixture is cooled, diluted with 750 ml. of water, stirred at room temperature for 30 minutes and subsequently extracted with 150 ml. portions of chloroform four times. The chloroform layers are collected, dried over sodium sulfate and the solvent is distilled off. Recrystallization of the residue (139 g.) with n-hexane yields 3,4-dimethyl-1-ethyl-4-hydroxy-1H-pyrazolo[3,4 - b]pyridine - 5 - carboxylic acid ethyl ester, M.P. 78–79.

(b) 4-chloro - 3,6 - dimethyl-1-ethyl - 1H - pyrazolo-[3,4-b]pyridine - 5 - carboxylic acid ethyl ester.—A mixture of 26.3 g. of 3,6-dimethyl-1-ethyl-4-hydroxy-1H-pyrazolo[3,4-b]pyridine-5-carboxylic acid ethyl ester (0.1 mol.) and 150 ml. of phosphorus oxychloride is refluxed for 4 hours. Then the excess phosphorus oxychloride is distilled off in vacuo and the oily residue is treated with water. The chloro compound is extracted with ether, the ether layer washed twice with water and dried over sodium sulfate. After distilling off the ether in vacuo, 25 g. of oily 4-chloro - 3,6 - dimethyl-1-ethyl-1H-pyrazolo[3,4-b]pyridine-5-carboxylic acid ethyl ester are obtained and used without further purification.

(c) 4,8-dimethyl - 6 - ethyl-3-hydroxy-1H,6H-dipyrazolo[3,4-b; 3',4'-d]pyridine.—19.5 g. of 4 - chloro-3,6-dimethyl-1-ethyl-1H-pyrazolo[3,4-b]pyridine - 5 - carboxylic acid ethyl ester (0.07 mol.) are dissolved in a mixture of 200 ml. of benzene and 130 ml. of pyridine. After adding 8.5 g. of hydrazine hydrate (98%) (0.168 mol.) the mixture is first stirred at room temperature for 4 hours and subsequently at 50–70° (bath temperature) for 3 hours. Then the reaction mixture is evaporated in vacuo and the residue is treated with 150 ml. of ethyl acetate to give the crystalline product 4,8-dimethyl-6 - ethyl - 3 - hydroxy - 1H,6H - dipyrazolo[3,4-b; 3', 4'-d]pyridine, which, after treating with water, is again filtered off, dried in the desiccator over phosphorus pentoxide, yield 11 g. (68.3%), and recrystallized from a mixture of ethyl acetate and ethanol, M.P. 268–270°.

(d) 4,8-dimethyl - 6 - ethyl-3-hydroxy-1-(2-phenethyl)-1H,6H-dipyrazolo[3,4-b; 3',4'-d]pyridine.—7.0 g. of 4,8-dimethyl - 6 - ethyl-3-hydroxy-1H,6H-dipyrazolo[3,4-b; 3', 4'-d]pyridine (0.03 mol.) are added to a solution of 1.2 g. of potassium (0.03 mol.) in 75 ml. of absolute ethanol. The clear solution is stirred for half an hour. Then ethanol is distilled off in vacuo and the residual potassium salt is dissolved in 75 ml. of dimethylformamide. Subsequently, 5.6 g. of 2-phenethylbromide (0.03 mol.) are added and the reaction mixture is stirred for 12 hours at room temperature. After evaporating the solution in vacuo, the 4,8-dimethyl-6-ethyl-3-hydroxy - 1 - (2-phenethyl) - 1H,6H-dipyrazolo[3,4-b; 3',4'-d]pyridine is treated with water for 2 hours, filtered off [yield 6.8 g. (68%)] and recrystallized from ethanol, M.P. 251–253°.

(e) 4,8-dimethyl - 3 - ethoxy-6-ethyl-1-(2-phenethyl)-1H,6H-dipyrazolo[3,4-b; 3',4'-d]pyridine.—To a solution of 0.32 g. of potassium (0.008 mol.) in 30 ml. of absolute ethanol, 2.7 g. of 4,8-dimethyl-6-ethyl-3-hydroxy-1-(2-phenylethoxy)-1-methyl-1H,6H-dipyrazolo[3,4-b; 3',4'-d]pyridine.

The following additional compounds are produced by the foregoing procedure:

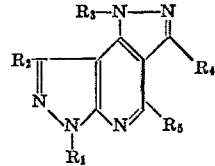

| Example | R₁ | R₂ | R₃ | R₄ | R₅ | M.P. |
|---|---|---|---|---|---|---|
| 33 | C₂H₅ | H | (CH₃)₂CH—CH₂—CH₂— | OH | H | 190–192°. |
|    | C₂H₅ | H | (CH₃)₂CH—CH₂—CH₂— | (CH₃)₂CH—CH₂—CH₂O— | H | 159–161° dec. hydrochloride. |
| 34 | C₂H₅ | H | ⟨phenyl⟩—CH₂ | OH | H | 233–236°. |
|    | C₂H₅ | H | Same as above | CH₃—CH₂—O | H | 99–100°. |
| 35 | ⟨phenyl⟩—CH₂ | H | CH₃ | OH | H | 278–280°. |
|    | Same as above | H | CH₃ | CH₃—O | H | 157–159°. |
| 36 | ⟨phenyl⟩—CH₂ | H | CH₃ | CH₃—CH₂—O | H | 147–149°. | phenethyl) - 1H,6H - dipyrazolo[3,4-b; 3',4'-d]pyridine (0.008 mol.) are added. The solution is stirred for 2 hours and then evaporated in vacuo. The resulting potassium salt is dissolved in 30 ml. of dimethylformamide and after adding 1.6 g. of ethyl iodide (0.01 mol.), stirring is continued for 10 hours at room temperature. Then the mixture is evaporated to dryness in vacuo and the residual 4,8-dimethyl-3-ethoxy - 6 - ethyl-1-(2-phenethyl)-1H,6H-dipyrazolo[3,4-b; 3',4'-d]pyridine is recrystallized from ethanol, yield 2.3 g. (80%), M.P. 122–124°.

EXAMPLE 32

6-ethyl-3-isopentoxy-1-methyl-1H,6H-dipyrazolo-[3,4-b; 3',4'-d]pyridine (a) 6-ethyl - 3 - hydroxy-1-methyl-1H,6H-dipyrazolo-[3,4-b; 3',4'-d]pyridine.—30.5 g. of 4-chloro-1-ethyl-1H-pyrazolo[3,4-b]pyridine - 5 - carboxylic acid, ethyl ester (0.12 mol.) are dissolved in 250 ml. of absolute benzene. While stirring and cooling by means of tap water, a solution of 10.8 g. of methylhydrazine (0.24 mol.) in 50 ml. of absolute benzene is dropped in quickly. After stirring for 2 hours at room temperature, the precipitate is filtered off under suction and washed with petroleum ether. Recrystallization from ethanol yields 24.9 g. (92%) of 6-ethyl-3-hydroxy-1-methyl - 1H,6H - dipyrazolo[3,4-b; 3', 4'-d]pyridine, M.P. 263–264°.

(b) 6-ethyl - 3 - isopentoxy-1-methyl-1H,6H-dipyrazolo [3,4-b; 3',4'-d]pyridine.—5.4 g. of 6-ethyl-3-hydroxy-1-methyl - 1H,6H - dipyrazolo[3,4-b; 3',4'-d]pyridine (0.025 mol.) are added to a solution of 1 g. of potassium (0.025 mol.) in 50 ml. of absolute ethanol; the whole is stirred for two hours at room temperature. Then the alcohol is distilled off in vacuo; 100 ml. of dimethylformamide and 4 g. of isopentyl bromide (0.0263 mol.) are added to the potassium salt. After stirring the mixture for 3 hours at room temperature, the precipitated potassium bromide is filtered under suction and the solution is evaporated in vacuo. To the oily residue, 60 ml. of water are added and the whole is stirred vigorously until the 6-ethyl-3-isopentoxy-1-methyl-1H,6H-dipyrazolo[3,4-b; 3',4'-d]pyridine becomes crystalline. It is filtered under suction, washed with water and dried in the desiccator over phosphorus pentoxide, yield 6.5 g. (90%) and recrystallized from n-hexane by cooling in the refrigerator, M.P. 84–86°.

By substituting bromobenzene and 2-phenethyl bromide for the isopentyl bromide in the foregoing procedure there are obtained, respectively, 6-ethyl-3-phenoxy-1-methyl-1H, 6H-dipyrazolo[3,4-b; 3',4'-d]pyridine and 6 - ethyl-3-(2-

EXAMPLE 37

6-ethyl-3-methoxy-1-methyl-1H,6H-dipyrazolo [3,4-b; 3',4'-d]pyridine 12 g. of 6-ethyl-3-hydroxy-1H,6H-dipyrazolo[3,4-b; 3', 4'-d]pyridine (0.06 mol.) are dissolved in 120 ml. of aqueous sodium hydroxide (5%). While stirring, 18.9 g. of dimethylsulfate (0.15 mol.) are added drop by drop to the solution at 30–35°. After stirring for an additional 3 hours at 35°, the solution is acidified to pH 6 with dilute acetic acid and then evaporated in vacuo to half its volume. The mixture is extracted four times with 50 ml. portions of ether and the 6-ethyl-3-methoxy-1-methyl-1H,6H-dipyrazole[3,4-b; 3',4'-d]pyridine is recrystallized from n-hexane after distilling off the ether, yield 9.9 g. (71.7%), M.P. 111–113°.

What is claimed is:

1. A compound of the formula

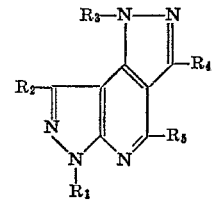

wherein

R₁ is hydrogen, lower alkyl, phenyl, phenyl-lower alkyl, cyclo-lower alkyl or furfuryl, R₂ is hydrogen or lower alkyl, R₃ is hydrogen, lower alkyl, phenyl, phenyl-lower alkyl, lower alkanoyl, halo-lower alkanoyl, benzoyl, halo-benzoyl, di-(lower alkyl)-amino-lower alkyl, lower alkanesulfonyl or toluenesulfonyl, R₄ is hydrogen, lower alkoxy, amino, lower alkyl, phenyl, halo-phenyl or lower alkoxy-phenyl, R₅ is hydrogen or lower alkyl, and physiologically acceptable acid addition salts thereof.

2. A compound as in claim 1 wherein R₁ is lower alkyl, R₂ is hydrogen and R₄ is lower alkyl.

3. A compound as in claim 1 wherein R₁ is lower alkyl, R₂ is hydrogen and R₄ is phenyl.

4. A compound as in claim 1 wherein R₁ is lower alkyl, R₂ is hydrogen and R₄ is amino.

5. A compound as in claim 1 wherein R₁ is lower alkyl, R₂ and R₅ each is hydrogen, R₃ is di(lower alkyl)amino-lower alkyl and R₄ is phenyl.

6. A compound as in claim 2 wherein R₁ is ethyl, R₃ and R₄ each is methyl and R₅ is hydrogen.

7. A compound as in claim 2 wherein $R_1$ is ethyl, $R_3$ is chlorobenzoyl, $R_4$ is methyl and $R_5$ is hydrogen.

8. A compound as in claim 5 wherein $R_1$ is ethyl and $R_3$ is dimethylaminopropyl.

9. A compound as in claim 4 wherein $R_1$ is ethyl and $R_3$ and $R_5$ each is hydrogen.

10. A compound as in claim 1 wherein $R_1$ and $R_3$ each is lower alkyl, $R_2$ and $R_5$ each is hydrogen and $R_4$ is lower alkoxy.

11. A compound as in claim 10 wherein each lower alkyl group is ethyl and the lower alkoxy group is ethoxy.

12. A compound as in claim 1 wherein $R_1$ is ethyl, $R_2$, $R_3$ and $R_5$ each is hydrogen and $R_4$ is ethoxy.

References Cited
UNITED STATES PATENTS
3,250,769   5/1966   Schmidt _____ 260—247

HENRY R. JILES, Primary Examiner
C. M. S. JAISLE, Assistant Examiner

U.S. Cl. X.R.

260—240 R, 250 R, 256.4 R, 256.5 R, 294.8 B, 295 AM, 294.9, 295 R, 295 T, 295.5 B, 296 B, 296 R, 310 R; 424—250, 251, 563